July 23, 1940.　　　　B. S. CAIN　　　　2,209,221
HEATING SYSTEM
Filed Dec. 1, 1939
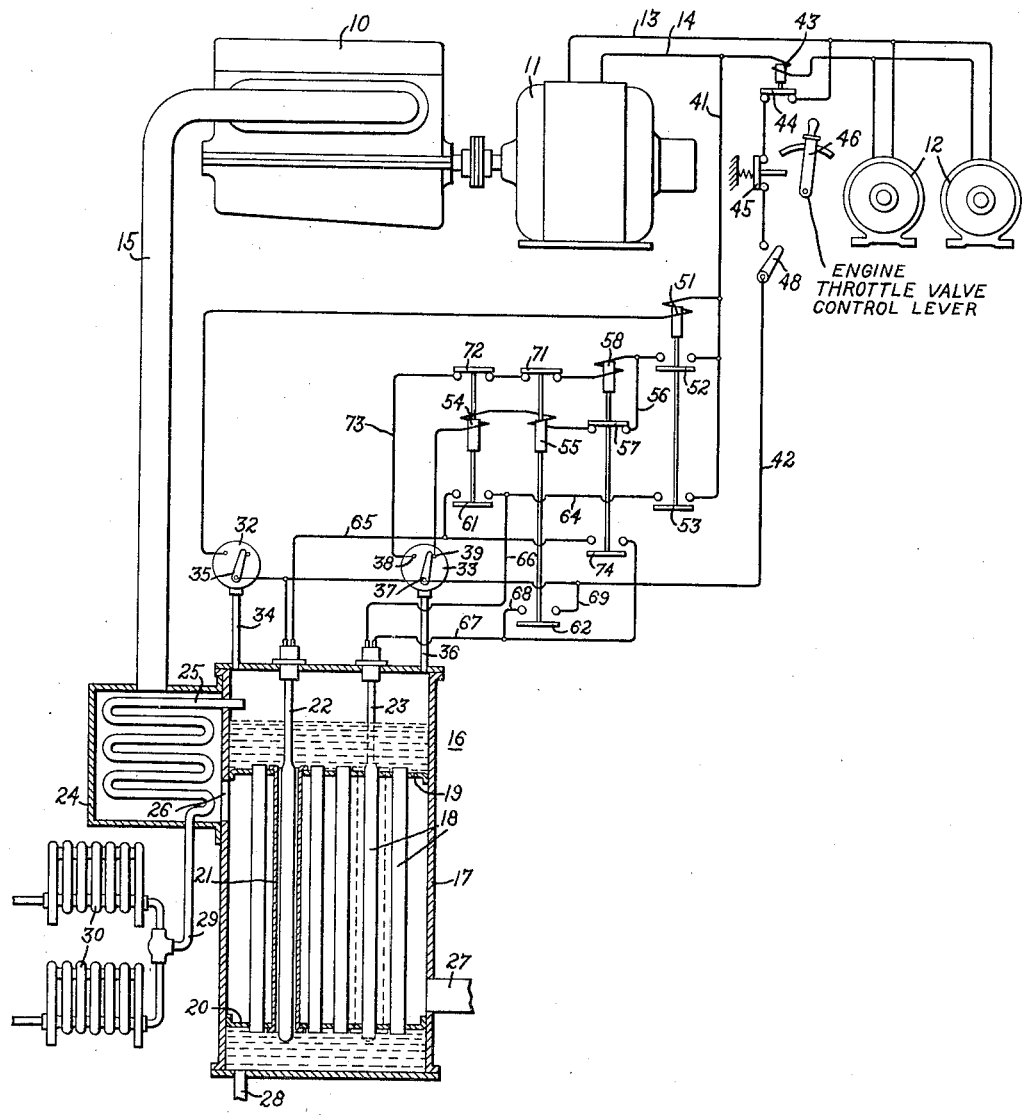
Inventor:
Basil S. Cain,
by Harry E. Dunham
His Attorney.

Patented July 23, 1940

2,209,221

UNITED STATES PATENT OFFICE 2,209,221

HEATING SYSTEM

Basil S. Cain, Erie, Pa., assignor to General Electric Company, a corporation of New York Application December 1, 1939, Serial No. 307,098

5 Claims. (Cl. 290—2)

The instant invention relates to heating systems and more particularly to heating systems for trains which are propelled by locomotives having an internal combustion engine and a generator for supplying power to traction motors.

It is an object of this invention to provide a new and improved heating system for trains propelled by locomotives of the type referred to which utilizes the latent heat of the products of combustion exhausted by the internal combustion engine and also energy developed by the generator in excess of the load requirements of the traction motors.

It is a further object of this invention to provide a new and improved control arrangement for a heating system utilizing latent heat of products of combustion of an internal combustion engine and also surplus energy from a generator driven by the engine for supplemental heating.

A still further object of this invention is to provide a new and improved heating system and a control arrangement therefor which is simple in design and efficient in operation.

In accordance with the illustrated embodiment of my invention the exhaust gases of the internal combustion engine are circulated through a boiler in which the latent heat is extracted therefrom. Auxiliary electric heaters are also provided in the boiler which are arranged to be connected to the generator for supplementally heating the boiler liquid during idling or light load conditions of the power plant. The connections for the auxiliary heaters are controlled primarily in accordance with the propulsion load conditions and supplementally controlled in accordance with the steam pressure conditions of the boiler.

For a consideration of what I believe to be novel my invention, attention is directed to the following description and the claims appended thereto taken in connection with the accompanying drawing.

The single figure of the drawing is a schematic diagram illustrating the invention as adapted for train heating. The internal combustion engine 10, such as a Diesel engine, is coupled to a generator 11 usually of the variable voltage type, which normally supplies power to the traction motors 12 through the leads 13 and 14. The products of combustion are conducted from the engine 10 through the conduit 15 to the boiler 16. The boiler 16 comprises an outer drum 17 having a plurality of water tubes 18 arranged therein and extending between the upper and lower tube sheets 19 and 20, respectively. A plurality of relatively larger water tubes 21 are provided between the tube sheets and are of such a size as will accommodate the longitudinal electric heater elements 22 and 23. A superheater comprising a drum 24 and an enclosed steam coil 25 is provided for superheating the steam generated within the boiler 16. The inlet end of the superheater coil 25 communicates with the steam chamber in the upper end of the drum 17, and the outlet end thereof is connected to the supply line 29 of the train heating system comprising a plurality of heat radiators 30. The exhaust gases from the engine 10 are first passed into the superheater drum 24 around the coil 25 and through the opening 26 into the boiler 16 around the various tubes 18 and 21. The cooled gases are discharged to atmosphere through the flue connection 27. Make up water is supplied to the boiler through the connection 28.

During periods when the traction motor load on the generator 11 is relatively light the auxiliary electric heaters 22 and 23 are connected in parallel with the traction motors so as to maintain the boiler steam pressure within predetermined desired limits, as indicated by the pressure responsive devices or switches 32 and 33. The pressure switch 32 which communicates with the steam chamber of the boiler 16 by conduit 34 is provided with a contact arm 35 which is normally in the closed circuit position and is adapted to be moved to the open circuit position upon the boiler steam pressure rising above a predetermined maximum value such as, for example, 195 pounds per square inch. The pressure switch 33 which is also in communication with the boiler steam chamber as by conduit 36 is provided with a movable contact arm 37 and a pair of fixed contacts 38 and 39. The switch 33 is adapted for controlling the circuit connections for the heater elements 22 and 23 for either parallel or series operation depending upon the steam pressure obtaining within the boiler. For example, if the steam pressure is below a predetermined value such as, for example, 190 pounds per square inch, the contact arm 37 will engage with the fixed contact 39 to connect the heater elements for parallel operation. If the steam pressure should rise above 190 pounds per square inch, the contact arm 37 will engage with the fixed contact 38 which will effect the connection of the electric heater elements for series operation.

Power is supplied to the auxiliary electric heaters from the buses 13 and 14 through connections 41 and 42 under the primary control of the traction motor load responsive device 43.

Upon a predetermined high load current the armature of device 43 will move the contacts 44 to the open circuit position to cut off the electric heater apparatus. If desired, another normally closed contact device 45 may be provided in the heater circuit which is arranged to be actuated to the open circuit position upon the main engine throttle valve control lever 46 being moved to a predetermined full load position. This control is advantageous in that the auxiliary heater load will be thrown off in advance of the actual response of the engine to the opening movement of the throttle valve control lever. A manually operable switch 48 may also be provided for deenergizing the electric heaters as desired.

Assume first that the power plant is in normal operation and that the contacts 44 and 45 and the switch 48 are closed and that the pressure of the steam in the boiler 16 is below 195 pounds. The arm 35 of the pressure switch 32 will be closed and a circuit will be completed for the control contactor 51 extending from the generator bus 14 through the line 41, winding of relay 51, through the contact arm 35 of the pressure switch 32, line 42, switch 48, contacts 45 and 44 to the other generator bus 13. The energized contactor 51 will pick up its arms 52 and 53. Assuming further that the boiler steam pressure is below 190 pounds, the contact arm 37 of the pressure switch 33 will be in engagement with the fixed contact 39 to complete an energizing circuit for the windings of the contactors 54 and 55. This energizing circuit extends from the energized line 41 through the closed contact 52 of the control contactor 51, line 56, the normally closed contact arm 57 of the contactor 58, windings of the contactors 55 and 54, fixed contact 39 and arm 37 of the pressure switch 33 to the energized line 42. The energized contactors 54 and 55 will move their contact arms 61 and 62, respectively, to the closed circuit position thereby establishing parallel energizing circuits for the electric heater elements 22 and 23. The energizing circuit for the heater element 22 will extend from the energized line 41 through the closed contact arm 53 of the control contactor 51, line 64, the closed contact arm 61 of the contactor 54, line 65 to one terminal of the heater element 22, while the other terminal of the heater element 18 is directly connected to the energized line 42. The energizing circuit for the heater element 23 extends from the energized line 64 through line 66 to one terminal of the heater element 23, while the other terminal of the heater element is connected through lines 67, 68, the closed contact arm 62 of the contactor 55, connection 69 to the energized line 42.

Assume now that the boiler steam pressure rises above 190 pounds and that the contact arm 37 of the pressure switch 33 moves over into engagement with the fixed contact 38. A control circuit will thereby be established for effecting the connection of the heater elements in series. The contactors 54 and 55 will be deenergized and an energizing circuit will be established for the contactor 58 which circuit will extend from the energized line 41 through the contact arm 52 of the control contactor 51, through the winding of the contactor 58, the closed contact arms 71 and 72 of the contactors 55 and 54, respectively, line 73, fixed contact 38, contact arm 37 of the pressure switch 33, to the energized line 42. As the contactor 58 moves to the upper position closing its contact arm 74, a circuit will be established for energizing the auxiliary heater elements 22 and 23 in series. This energizing circuit will extend from the energized line 41 through the closed contact 53 of the contactor 51, lines 64, 66, heater element 23, line 67, closed contact arm 74 of the contactor 58, line 65, heater element 22 to the other energized line 42. In the event that the boiler steam pressure rises above 195 pounds, the contact arm 35 of the pressure responsive device 32 will move to the open circuit position thereby deenergizing the control contactor 51, the various other contactors and the auxiliary heater elements.

Having described the principle of operation of my invention together with the apparatus which I now consider to represent the best embodiment thereof, I desire to have it understood that the apparatus shown is merely illustrative and that the invention may be carried out by other means.

What I claim as new and desire to secure by Letters Patent of the United States, is:

1. In a heating system, the combination comprising an internal combustion engine, a generator coupled to said engine, a boiler containing a heating fluid, said boiler comprising a plurality of water tubes and a superheater unit, a superheater coil in said unit for receiving steam from said boiler and supplying it to the train heating system, conduit means for conducting the products of combustion from said engine to said superheater unit, means for conducting the products of combustion from said superheater unit into said boiler into heat exchanging relationship with said water tubes, a plurality of auxiliary electric heating elements arranged in a heat exchanging relationship with the liquid in said boiler, means for connecting said heating elements to said generator, and means responsive to a predetermined generator load for disconnecting said heater elements.

2. In a heating system for a train, the combination comprising an internal combustion engine, a generator driven by said engine for normally supplying power to the train propulsion motors, a boiler for supplying steam to the train heating system, means for conducting the products of combustion from said engine through said boiler, auxiliary electric heater elements arranged in said boiler, means connecting said heater elements to said generator, means for disconnecting said heater elements from said generator in accordance with a predetermined condition of adjustment of said engine, and means responsive to the boiler steam pressure for selectively controlling the connections of said auxiliary heater elements to said generator for series or parallel energization.

3. In a train heating system, the combination comprising an internal combustion engine, a generator driven by said engine for normally supplying power to the train propulsion motors, a boiler for supplying heating fluid to said system, conduit means for conducting the products of combustion from said engine through said boiler, auxiliary electric heating elements arranged in said boiler, means for connecting said auxiliary heating elements to said generator, means for selectively connecting said heater elements in either parallel or series relationship in accordance with the boiler steam pressure, and means for disconnecting said heater elements from said generator upon a predetermined load occurring on said generator.

4. In a heating system, the combination comprising an internal combustion engine, an electric generator coupled to said engine, a variable load normally connected to said generator, a boiler, conduit means for conducting the products of combustion from said engine through said boiler, auxiliary electric heating elements in said boiler, means for connecting said heating elements to said generator, and means for controlling said connecting means in accordance with the electric load on said generator.

5. In a heating system, the combination comprising an internal combustion engine, a generator driven by said engine, a variable load normally connected to said generator, a boiler, means for passing the products of combustion from said engine through said boiler for heating liquid contained therein, auxiliary electric heating elements arranged in said boiler, and means for selectively connecting said auxiliary heating elements to said generator in accordance with pressure conditions obtaining in said boiler.

BASIL S. CAIN.